(No Model.)
J. J. DOUGHERTY.
ORNAMENTAL SCREEN FOR LADIES' BICYCLE SADDLES.
No. 586,165. Patented July 13, 1897.
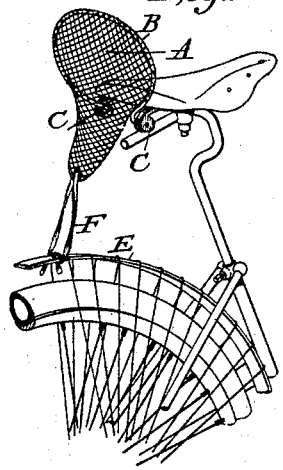
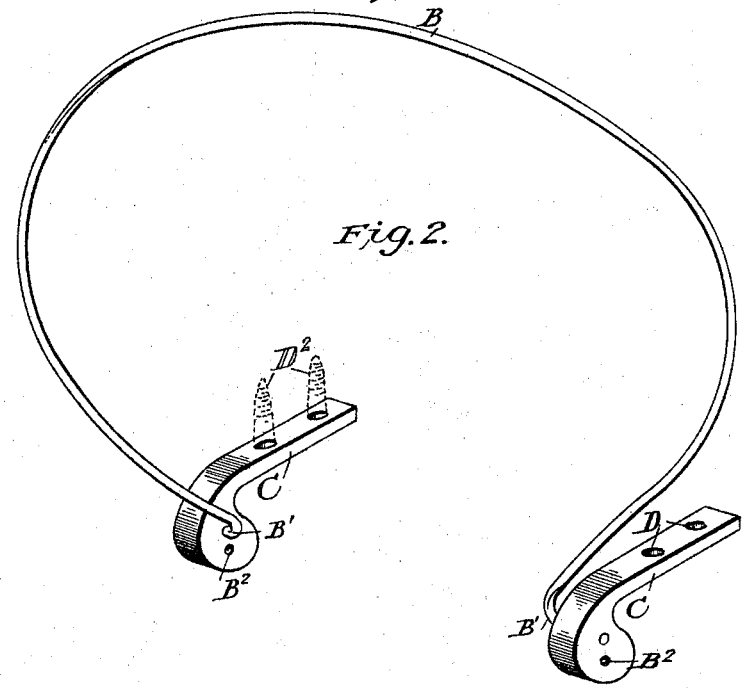
Witnesses
Nellie Reardon
Nora Tuohey
Inventor:
John J. Dougherty
By John F. Kerr
Attorney.

UNITED STATES PATENT OFFICE.

JOHN J. DOUGHERTY, OF PATERSON, NEW JERSEY.

ORNAMENTAL SCREEN FOR LADIES' BICYCLE-SADDLES.

SPECIFICATION forming part of Letters Patent No. 586,165, dated July 13, 1897.

Application filed September 3, 1896. Serial No. 604,821. (No model.)

*To all whom it may concern:*

Be it known that I, JOHN J. DOUGHERTY, of the city of Paterson, in the county of Passaic and State of New Jersey, have invented certain new and useful Improvements in Ornamental Screens for Ladies' Bicycles, of which the following is a specification.

This invention relates to a fixed ornamental screen for bicycle-seats, and is designed especially for lady riders as a mask or ornamental screen to give the bicycle a dressy appearance and to shield to a certain extent the form of the rider.

The invention consists of a wire frame composed of a single piece of wire bent in the shape of a fan, the two ends of which are secured in brackets or angle-pieces, which are in turn secured to the bottom of the saddle, and a netting of textile or other suitable material laced to said wire frame, the netting coming to a point at the bottom and being tied to the guard on wheel.

The invention is not intended for a brace or support for the back of the rider, but to give the rider and the bicycle a graceful appearance.

The clothing of the rider, while it may be arranged for comfort, frequently may not be arranged to avoid attracting attention and criticism.

My invention, while simple in construction and costs but a trifle, adds but little to the weight carried and attains the results desired.

In the accompanying drawings, which form a part of this specification, Figure 1 is a view of screen attached to the saddle. Fig. 2 is a side view of the bracket C, showing the hooked or looped ends of wire B passing through the same and method of securing the bracket to bottom of saddle.

In the drawings, A represents the silk or other netting, B the fan-shaped bent wire, and B' the hooked or looped ends which are secured beneath the saddle in the brackets C by being passed through the holes $B^2$ in the bracket C. The bracket C is secured to the under side of the saddle by screw D.

E represents the guard on the wheel.

F are bands, ribbons, or cords for tying the lower portion of the network to the wheel-guard. The ribbons F may be tied in various styles to suit the fancy. Netting of various colors may be used, the whole making a screen which adds to the appearance of the wheel and rider.

As is obvious, no upholstering is necessary, and my invention may be secured to any saddle.

With this description of my invention, what I claim, and desire to secure by Letters Patent, is—

A screen for the saddle of ladies' bicycles consisting of the wire B bent fan shape, and having looped or hooked ends B', brackets C provided with the holes $B^2$ through which the hooked ends B' are passed, a net A laced to the bow portion of said fan-shaped wire B, and means for securing the brackets C, to the bottom of the saddle, substantially as shown and described.

JOHN J. DOUGHERTY.

Witnesses:
  WM. M. DREW,
  JOHN F. KERR.